United States Patent [19]

Wynne

[11] Patent Number: 4,796,984
[45] Date of Patent: Jan. 10, 1989

[54] OPTICAL IMAGING SYSTEMS

[75] Inventor: Charles G. Wynne, Hailsham, England

[73] Assignee: National Research Development Corporation, London, England

[21] Appl. No.: 145,761

[22] PCT Filed: May 21, 1987

[86] PCT No.: PCT/GB87/00348
§ 371 Date: Jan. 22, 1988
§ 102(e) Date: Jan. 22, 1988

[87] PCT Pub. No.: WO87/07392
PCT Pub. Date: Dec. 3, 1987

[30] Foreign Application Priority Data

May 23, 1986 [GB] United Kingdom ............... 8612609

[51] Int. Cl.$^4$ .............................................. G02B 17/00
[52] U.S. Cl. .................................................... 350/444
[58] Field of Search ......................................... 350/444

[56] References Cited

U.S. PATENT DOCUMENTS 3,748,015  7/1973  Offner .
4,171,871 10/1979  Dill .
4,293,186 10/1981  Offner .
4,344,676  8/1982  Shafer ................................. 350/444

FOREIGN PATENT DOCUMENTS 3033509  4/1981  Fed. Rep. of Germany .

Primary Examiner—John K. Corbin
Assistant Examiner—Rebecca D. Gass
Attorney, Agent, or Firm—Cushman, Darby & Cushman

[57] ABSTRACT

A substantially unity magnification image forming system includes at least one convex mirror and at least one concave mirror supported with their centres of curvature substantially coincident and means to define a location for an oject the image of which after at least three reflections including at least one reflection at each of said mirrors is a real image at a second location and a monocentric meniscus lens between the mirrors to give overall correction for Petzval sum.

5 Claims, 3 Drawing Sheets

OPTICAL IMAGING SYSTEMS

This invention relates to optical imaging systems and, in particular, to optical imaging systems for forming an image of an object at unit magnification.

U.S. Pat. No. 3,748,015 describes an optical imaging system for forming an image of an object at unit magnification and high resolution by means of convex and concave spherical mirrors arranged with their centres of curvature coincident. The mirrors are arranged to produce at least three reflections within the system and they are used in the system. Two off-axis conjugate areas at unit magnification are in a plane which contains the centre of curvature, the axis of the system being an axis normal to this plane and through the mirror centre.

Any unit magnification system that consists of two equal halves disposed symmetrically about a central aperture stop is intrinsically free from various types of aberration, in particular all orders of distortion and coma. The prior art system shares this characteristic, but it suffers from other aberrations and limitations which restrict its performance. In particular:

(a) It is inherent in the design that it only gives sharp imagery over a quite narrow annular area in the focal plane, so that it is necessary to use the system with a narrow arcuate slit aperture exposing only this area, and to copy the object (mask) to an image surface by scanning them both, in synchronism, across this aperture. This requires extreme mechanical precision if one micron or less is to be resolved; and the scanning process is obviously slower than direct exposure over the whole area.

(b) For any aberration free optical system, there is an inherent limit of resolving power, which is proportional to the numerical aperture (N.A.) and in the prior art system there is a practical limit to the attainable N.A. In the specific embodiment of the prior art (and in practical realisations thereof) this maximum N.A. is about 0.18 (equivalent at f/2.78) which gives a theoretical limit of resolution (at which the optical transfer function falls to zero), at a wavelength of 400 nm, at a spacing of 1.1 $\mu$m. This is certainly inadequate for future requirements. A larger N.A. could only be realised by moving object and image further from the centre, and as this is done the aberrations increase, and the masking slit width decreases rather rapidly.

In order to overcome this drawback, we have devised a means of improving the correction of aberrations.

In Sov.J.Opt.Technol. 50(3), March 1983 153, there are described unit magnification imaging systems with compensation meniscus lenses. However, the design parameters of the systems described therein are constrained so that the monocentric meniscus is wholly on the object side of the secondary mirror so that it is not traversed a second time by light between the first and second mirror reflections. We have found that, contrary to this teaching, far greater improvement in imagery arise when the meniscus lies between the mirrors.

According to the present invention, there is provided a substantially unity magnification image forming system comprising at least one convex mirror and at least one concave mirror, said mirrors being supported with their centres of curvature substantially coincident and means to define a location for an object the image of which after at least three reflections including at least one reflection at each of said mirrors is a real image at a second location and further comprising a monocentric meniscus lens between said concave and said convex mirrors substantially to give overall correction for Petzval sum, to produce with said meniscus lens at said second location a stigmatic image of an object at said first location.

The invention will now be described, by way of example, with reference to the accompanying drawings, in which.

Figure 5A:
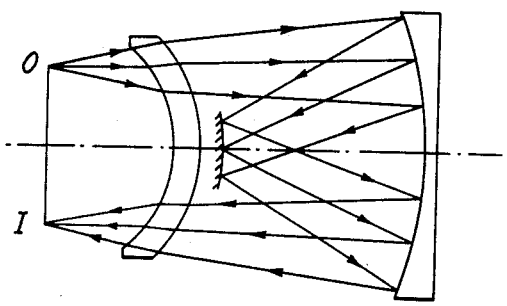
Figure 5B:
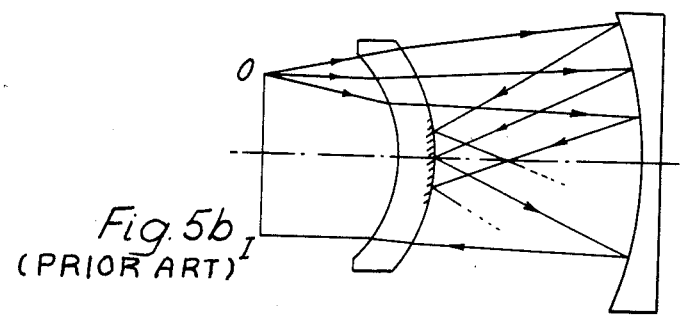
Figure 6A:
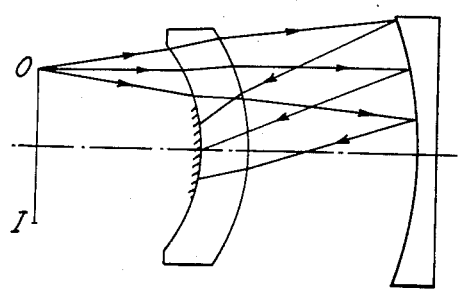
Figure 6B:
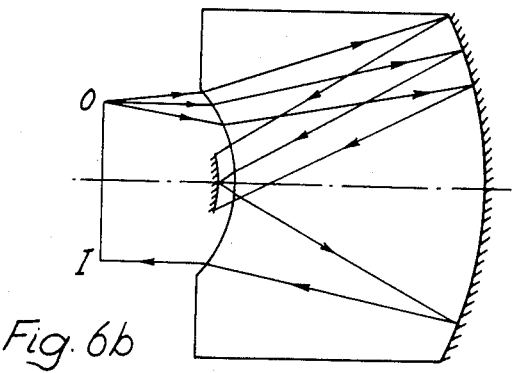

FIGS. 5a–b are diagrammatic representations of a second prior art imaging system; and FIGS. 6a–c are diagrammatic representations of imaging systems in accordance with the present invention.

Figure 1:
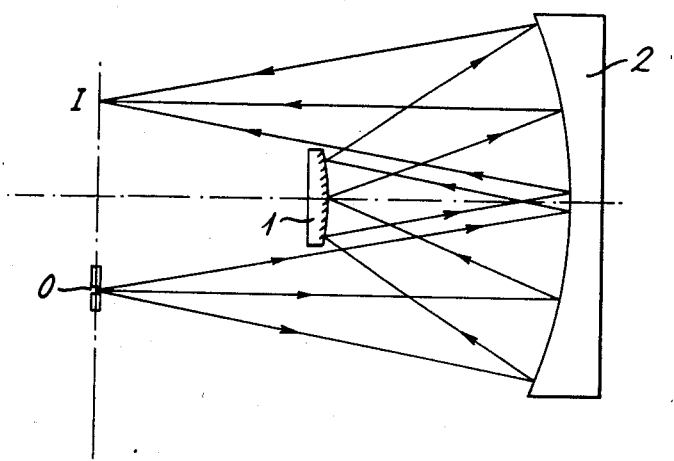
FIG. 1 is a diagrammatic representation of a prior art catoptric imaging system

Referring now to FIG. 1 of the drawings, an imaging system comprises two spherical mirrors, a convex mirror 1 and a concave mirror 2, arranged to provide three reflections in the system. The mirrors are arranged with their centres of curvature coincident and to have off-axis conjugate areas centred at the points O and I. The points O and I are each at a distance h from the reference axis A and at opposite sides thereof.

Although the object and image surfaces are shown as coplanar, they can be separated to more convenient locations by the insertion of plane mirrors, but this does not affect the mechanical precision needed for scanning.

Figure 2:
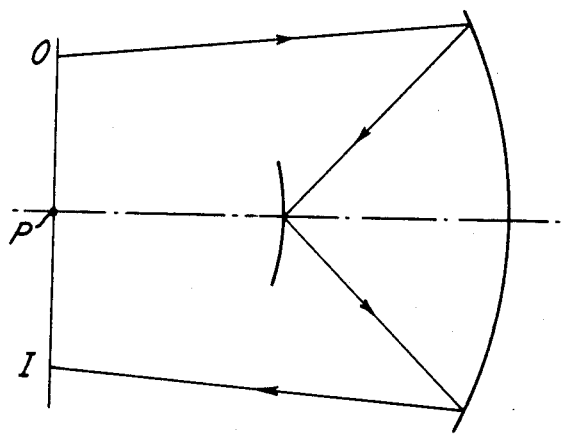
FIGS. 2, 3, 4a and 4b are diagrams used in explaining the operation of the imaging system of FIG. 1

For such a system, we consider a ray of light, undergoing three reflections. The line joining the common centre of the mirror P, to the point where the ray meets the convex mirror obviously constitutes an axis of symmetry, and the incident and emergent rays are equidistant from the common centre on opposite sides of the axis, and their inclinations with the axis are equal and opposite (FIG. 2). We take an object/image plane through P, normal to this axis, containing object and image points O and I, and consider this first ray as the central ray (principal ray) of a pencil emerging from O.

Figure 3:
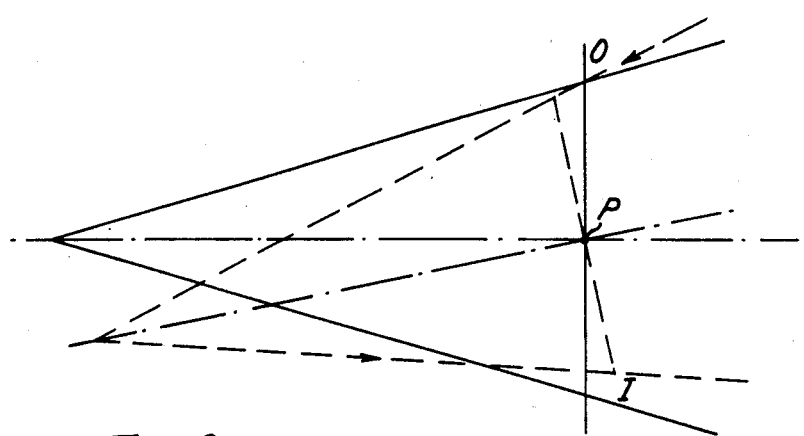

An aperture ray of this pencil, shown dotted in FIG. 3, makes an aperture angle u with the principal ray. Since the system is monocentric, this aperture ray, after three reflections, will emerge at the same distance as the incident ray from P, on the opposite side, and equally and oppositely inclined to the line joining P to the point of incidence of this ray on the convex mirror (a subsidiary axis).

The emergent aperture ray will not pass through the image point P (the imagery will be aberrated) unless the incident and triply reflected rays are parallel. When this condition is satisfied, the system is said to be telecentric, and the simple monocentric three-reflection system is inherently incapable of meeting this condition over an extended range of object/image positions. The system is said to show spherical aberration of principal rays.

Figure 4A:
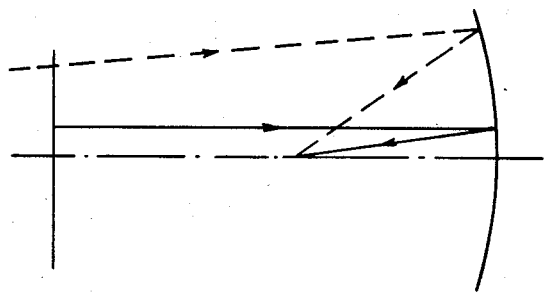
Figure 4B:
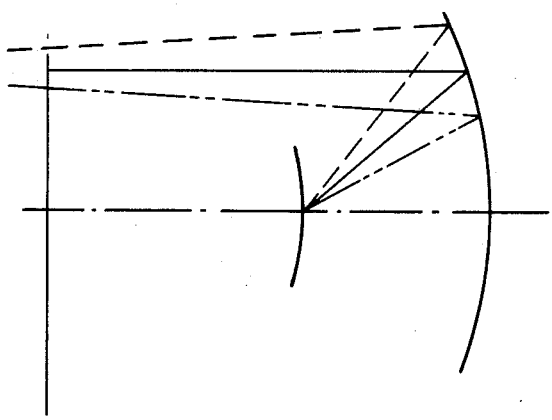

The condition is approximately satisfied for an object very close to the centre of curvature, if the Petzval sum is zero (for this system, this means that the radius of the convex mirror is one half that of the concave). but in that case principal rays from objects further away from the mirror centre, that strike the centre of the convex mirror, become necessarily more divergent (FIG. 4a). By a suitable choice of mirror radii, principal rays at some required object distance can be made telecentric. but at larger and smaller object distances, they will be divergent or convergent respectively (FIG. 4b).

There is no obvious way of securing perfect correction of principal ray spherical aberration in a monocentric optical system but a high level of correction may be obtained by adding an appropriate monocentric meniscus lens to the three-reflection system of the above type, the lens and mirror dimensions being chosen to give approximate overall correction for Petzval sum.

The level of improvement depends on the location of the meniscus corrector. First order correction of principal ray spherical aberration can be provided by a meniscus whose concave surface is relatively close to the focal plane, in which case the meniscus will be relatively thin (FIG. 5a) or by a meniscus further from the focal plane (and therefore having shallower curvatures) in which case the meniscus must be thicker (FIG. 5b). In each case correction of primary principal ray spherical aberration is possible, but perfect correction is not obtained due to the presence of higher orders of aberration although these uncorrected residuals are successively reduced, as the meniscus corrector is moved away from the focal plane, and the overall level of aberration correction of the system is thereby improved. We have found that a significant improvements is obtained when the meniscus lens is positioned between the two mirrors.

The effect of this is that the limitations of performance of the prior art system discussed above are considerably reduced. The narrow width of the annular area of sharp imagery is greatly extended, for example, a level of image quality in the prior art arrangement which restricts the slit width to 0.25 mm can permit a width of a centimeter or more. And it becomes possible to secure good performance over larger numerical apertures than the simple 3-mirror system can yield, for example 0.28 in place of 0.18.

Fabrication may be simplified in the preferred embodiments where one of the mirrors is deposited as a reflecting layer on part of a surface of the meniscus.

EXAMPLE 1

A 1:1 copier lens of numerical aperture 0.28 has a construction as shown in FIG. 6a. It is corrected for object/image distances from the central axis 5.6 cm to 5.9 cm (slit width 3 mm). Its parameters are as shown in Table 1.

TABLE 1

| surface number | radius | axial separation 10.0 to object | refractive index 1.0 (air) | full diameter |
|---|---|---|---|---|
| 1 | −10.0000 | | | 15.6 |
| | | 2.6220 | 1.5010 | |
| 2 | −12.6220 | | | 18.2 |
| | | 10.4876 | 1.0 | |
| 3 (M1) | −23.1096 | | | 25.6 |
| | | −10.4876 | −1.0 | |
| 4 | −12.6220 | | | |
| | | −2.6220 | −1.5010 | |
| 5 (M2) | −10.0 | | | 5.6 |
| | | 2.6220 | 1.5010 | |
| 6 | −12.6220 | | | |
| | | 10.4876 | 1.0 | |
| 7 (M3) | −23.1096 | | | 25.6 |
| | | −10.4876 | −1.0 | |
| 8 | −12.6220 | | | 18.2 |
| | | −2.6220 | −1.5010 | |
| 9 | −10.0000 | | | 15.6 |
| | | −10.00 to focus | −1.0 | |
| 10 | ∞ image | | | 11.8 |

Dimensions in centimeters. A negative radius is concave to the object/image plane. A change of sign of refractive index indicates a reflection.

EXAMPLE 2

A 1:1 copier lens of numeric aperture 0.23 has a construction as shown in FIG. 6b. It is corrected for object/image distances from the central axis 5.5 cm to 6.0 cm (slit width 5.0 mm). Its parameters are as shown in Table 2.

TABLE 2

| surface number | radius | axial separation 13.0 to object | refractive index 1.0 (air) | full diameter |
|---|---|---|---|---|
| 1 | −13.0000 | | | 16.7 |
| | | 24.9032 | 1.5000 | |
| 2 (M2) | −37.9032 | | | 36.2 |
| | | −24.9032 | −1.5000 | |
| 3 | −13.0 | | | |
| | | −1.4344 | −1.0 | |
| 4 (M2) | −11.5656 | | | 5.2 |
| | | 1.4344 | 1.0 | |
| 5 | −13.0 | | | |
| | | 24.9032 | −1.5000 | |
| 6 (M3) | −37.9032 | | | 36.2 |
| | | −24.9032 | −1.5000 | |
| 7 | −13.0 | | | 16.7 |
| | | −13.0000 | −1.0000 | |
| 8 | ∞ image | | | 12.0 |

Dimensions in centimeters. A negative radius is concave to the object/image plane. A change of sign of refractive index indicates a reflection.

The possibility of various modifications which remain within the ambit of the invention will be apparent to those skilled in the art. For example, although single concave and convex mirrors have been illustrated, it is possible to use a plurality of mirrors of the equal or different curvatures to achieve the same effect.

I claim:

1. A substantially unity magnification image forming system comprising at least one convex mirror and at least one concave mirror, said mirrors being supported with their centres of curvature substantially coincident and means to define a location for an object the image of which after at least three reflections including at least one reflection at each of said mirrors is a real image at a second location characterised in that it comprises a monocentric meniscus lens between said concave and said convex mirrors substantially to give overall correction for Petzval sum, to produce with said meniscus lens at said second location a stigmatic image of an object at said first location.

2. A substantially unity magnification image forming system as claimed in claim 1 characterised in that at least one of said mirrors is contiguous with a surface of said meniscus lens.

3. A substantially unity magnification image forming system as claimed in claim 2 characterised in that said concave mirror is formed on a surface of said meniscus lens.

4. A substantially unity magnification image forming system as claimed in claim 2 characterised in that said convex mirror is formed on a surface of said meniscus lens.

5. A substantially unit magnification image system as claimed in claim 1 characterised in that it includes a plurality of concave mirrors.

* * * * *